US008312972B2

(12) United States Patent
Gremaud et al.

(10) Patent No.: US 8,312,972 B2
(45) Date of Patent: Nov. 20, 2012

(54) BRAKE EQUIPMENT FOR HOLDING AND BRAKING AN ELEVATOR CAR IN AN ELEVATOR INSTALLATION AND A METHOD OF HOLDING AND BRAKING AN ELEVATOR INSTALLATION

(75) Inventors: Nicolas Gremaud, Wadenswil (CH); Mathis Baur, Zurich (CH); Daniel Fischer, Villarsel sur Marly (CH)

(73) Assignee: Inventio AG, Hergiswil NW (CH)

( * ) Notice: Subject to any disclaimer, the term of this patent is extended or adjusted under 35 U.S.C. 154(b) by 316 days.

(21) Appl. No.: 11/950,599

(22) Filed: Dec. 5, 2007

(65) Prior Publication Data

US 2008/0128218 A1 Jun. 5, 2008

(30) Foreign Application Priority Data

Dec. 5, 2006 (EP) .................................... 06125391

(51) Int. Cl.
*B66B 5/22* (2006.01)
*B61H 7/12* (2006.01)
*F16D 51/60* (2006.01)

(52) U.S. Cl. .......... 187/372; 187/371; 187/376; 188/43; 188/136

(58) Field of Classification Search .................. 187/350, 187/356, 363, 364, 367, 370, 371, 372, 376; 188/43, 250 R, 134, 136
See application file for complete search history.

(56) References Cited

U.S. PATENT DOCUMENTS

| | | | | |
|---|---|---|---|---|
| 3,327,811 | A * | 6/1967 | Mastroberte | 187/305 |
| 5,224,570 | A * | 7/1993 | Fromberg | 187/376 |
| 5,370,208 | A * | 12/1994 | De Jong | 187/372 |
| 6,176,350 | B1 * | 1/2001 | Schlosser | 187/368 |
| 6,371,261 | B1 * | 4/2002 | Thompson et al. | 188/250 G |
| 6,758,310 | B2 * | 7/2004 | Muff et al. | 187/370 |
| 6,802,402 | B2 * | 10/2004 | Bausch et al. | 188/171 |
| 7,299,898 | B2 * | 11/2007 | Husmann | 187/373 |
| 2002/0117357 | A1 | 8/2002 | Hugel | |
| 2003/0085078 | A1 | 5/2003 | Simmonds et al. | |
| 2004/0262091 | A1 * | 12/2004 | Ito | 187/372 |

FOREIGN PATENT DOCUMENTS

| | | | |
|---|---|---|---|
| DE | 39 34 492 | A1 | 4/1990 |
| EP | 0 999 168 | A | 5/2000 |
| EP | 1 528 028 | A2 | 5/2005 |

* cited by examiner

*Primary Examiner* — Emmanuel M Marcelo
*Assistant Examiner* — Stefan Kruer
(74) *Attorney, Agent, or Firm* — Fraser Clemens Martin & Miller LLC; William J. Clemens

(57) ABSTRACT

Brake equipment for holding and braking an elevator car in an elevator installation, which is arranged to be movable along a brake track in two directions of travel, includes a mount with a brake lining which automatically adjusts under friction couple with the brake track on movement of the elevator car relative to the rail and in that case tightens a first tightening means, which can be released by an actuator. The first tightening means tightens the mount together with the brake lining against the brake track by a biasing force. The brake equipment produces, with unmoved brake equipment and an unreleased state of the actuator, a holding force acting in both directions of travel. The holding force is determined substantially by the biasing force acting on the mount.

14 Claims, 3 Drawing Sheets

1
2', 5'
14'
13'
3, 10
3, 3.2
12'a
12'
6'

BRAKE EQUIPMENT FOR HOLDING AND BRAKING AN ELEVATOR CAR IN AN ELEVATOR INSTALLATION AND A METHOD OF HOLDING AND BRAKING AN ELEVATOR INSTALLATION

FIELD OF THE INVENTION

The present invention relates to brake equipment for holding and braking an elevator car in an elevator installation and to a corresponding method. The elevator installation includes an elevator car which is arranged to be movable along one or more rails in an elevator shaft in upward and downward directions. The elevator car is in that case driven by a drive either directly or indirectly by way of support means and the car is held and secured by brake equipment. As a rule the car further includes a counterweight which is connected with the car by way of the support means. The counterweight partly compensates for the weight of the car.

BACKGROUND OF THE INVENTION

In operation of such an elevator installation it is necessary to take three different braking situations into consideration: holding of the car at a floor stop; retardation of the car in the case of intact support means (also termed emergency stop in the following); and retardation of the car in the case of failure of the support means (termed free-fall braking in the following).

In that case different braking forces must be applied in the different braking situations; thus, for example, for a free-fall braking the braking force must hold the full weight force of the car, for which partial compensation is no longer provided by the counterweight, i.e. the equilibrium. If the brake equipment arrangement comprises two redundant items of brake equipment, then an emergency stop shall also be guaranteed by only one brake equipment, which therefore for reasons of accident safety, for example at a floor stop, consequently has to make available twice the braking force.

If the brake equipment acts with friction couple, the normal forces which the brake equipment must make available also differ in correspondence with the different braking forces. Thus, for example, with a brake equipment arrangement which comprises two items of brake equipment each with two brake circuits a normal force $FLN_H$ of at least 6150 N per brake circuit is required for holding the car at a floor stop.

$$FLN_H=(\text{rated load}/2\times g)/(\mu\times 2\times 2)$$

$FLN_H$: required holding force for holding the car at standstill with 50% counterweight balancing rated load: possible loading of the car (example: rated load=1000 kg)

g: gravitational acceleration, 9.81 $m/s^2$

μ: coefficient of friction (example: μ=0.2)

$$FLN_H=(1000/2\times g)/(0.2\times 2\times 2)=6150\ N$$

In the case of an emergency stop, with merely one brake equipment now according to requirements a car at a loading of 125% shall, at least, not be further accelerated. In the above example, the required normal force $FLN_N$ accordingly increases to:

$$FLN_N=(1.5\times\text{rated load}/2\times g)/(\mu\times 2\times 2)$$

$$FLN_N=(1.5\times 1000/2\times g)/(0.2\times 1\times 2)=18600\ N.$$

For free-fall braking it is further required that the fully laden car shall be safely retarded under the action of all available items of braking equipment. With use of the above example and the assumption that the weight of the empty car is approximately 80% of the rated load and the required minimum retardation of the car is 0.2 g, there results a required normal force $FLN_F$ for braking the car of:

$$FLN_F=(1.8\times\text{useful load}\times(g+a))/(1\times 2\times 2)$$

$$FLN_F=(1.8\times 1000\times 1.2\ g)/(0.2\times 2\times 2)=26500\ N$$

On the other hand, however, the maximum normal forces required for a free-fall braking should not always act in the different braking situations, since these forces on the one hand strongly load the brake equipment and the rail and on the other hand much energy is required in order to release the brake equipment—which for safety reasons is to automatically apply in the event of failure of the energy supply—during normal travel operation.

Hitherto, therefore, respective individual items of brake equipment were provided for the different braking situations.

Thus, for example, pure braking equipment for braking an elevator car is known from, for example, DE 39 34 492 A1, in which a movable brake lining is displaced by an elevatoring device, or by a movement of the elevator car, on a wedge surface, which then automatically adjusts the movable brake lining under friction couple with the rail. Only by this adjusting movement is a spring stressed, which can counteract an electromagnet in order to regulate the normal force acting on the movable brake lining. This brake equipment is not suitable for holding an elevator car, since it requires a movement of the elevator car for actuation.

EP 1 528 028 A2 describes holding brake equipment in which a reset passive brake lining takes over the function of an active brake lining, which is biased by a compression spring against the rail and which is releasable by an actuator, if this brake lining fails. The brake equipment is for this purpose mounted to be floating. In this brake equipment always the same normal force, which is defined by the spring stress, is exerted on the brake lining when the brake equipment is activated or released. If such brake equipment is to therefore take over not only the holding braking function, but also the emergency stop braking function, this normal force has to be sufficient for braking and is thus over-dimensioned for the normal holding function. Such an over-dimensioned holding normal force, however, disadvantageously loads the brake equipment and the rail and requires a high level of actuator energy for release of the strongly biased spring.

SUMMARY OF THE INVENTION

It is therefore an object of the present invention to provide brake equipment which can exert different normal forces on brake linings in the case of activation of the brake equipment for holding and braking. Moreover, the normal force for holding and thus an actuator required for release or deactivation of the brake equipment can be designed to be minimal.

A brake equipment according to the present invention, for holding and braking an elevator car in an elevator installation, which brake equipment is arranged to be movable relative to a brake track along this brake track in two directions of travel, comprises a brake lining which is mounted in a mount and which under friction couple with the brake track in the case of movement of the brake equipment relative to the brake track automatically adjusts in at least one of the two directions of travel and in that case tightens a first tightening means which tightens the brake lining against the rail by tightening force, and which can be released by an actuator.

The activated actuator in normal operation releases the brake lining, i.e. removes it from the brake track and thus interrupts the friction couple between these, whereby the brake equipment does not exert any braking action. The brake equipment is thus deactivated. If the actuator is deactivated, then the first tightening means presses the brake lining against the brake track and thus activates the brake equipment. The normal force $FLN_H$ or biasing force exerted in that case by the tightening means on the movable brake lining defines the friction force between it and the brake track. According to the present invention the brake equipment is constructed in such a manner that when the actuator is released and the brake equipment is not moving a holding force substantially corresponding with the biasing force and acting in both directions of travel can be generated. The biasing force is conducted by way of the brake lining and the associated brake plate mount in such a manner that the friction force or the braking force can be used for holding, i.e., in particular, the brake lining does not slip away within the scope of the provided holding force. The biasing force can thereby be kept to a minimum and since the brake lining, in the case of movement of the brake equipment or when the provided holding force is exceeded, automatically adjusts relative to the brake track, i.e. moves in such a manner that the first tightening means is further tightened, the normal force exerted by the first tightening means on the brake lining increases until a normal force $FLN_N$, which is sufficient for an emergency stop, or the braking force resulting therefrom is available. By adjustment there is understood to that extent in the present case, in particular, a movement of the brake lining already contacting the brake track with friction couple, or of a corresponding control means, such that the first tightening means is further tightened.

According to an advantageous embodiment of the present invention, the brake device comprises a first adjustment limiting means which in a first setting blocks an adjusting movement of the brake lining and in a second setting makes an adjusting movement of the brake lining possible. If the brake equipment is to exert a holding function then the first adjustment limiting means is switched to the first setting. An adjusting movement of the movable brake lining is effectively prevented by the adjustment limiting means switched to the first setting. This preferably takes place actively by a lock supplied with energy, so that in the case of failure of this energy supply the first adjustment limiting means is switched to the second setting automatically or under the action of the adjusting movement of the movable brake lining. Alternatively, the position of the lock is coupled with a defined pressing-away force so that the lock automatically switches to the second setting before slipping of the lining.

For an emergency stop the actuator and the lock are deactivated, whereas the elevator car moves or the lock deactivates itself, since the brake lining slips and exerts a correspond pressing-away force on the automatically switching lock. The first tightening means moves the brake lining against the brake track, which adjusts this under friction couple. The first tightening means is thereby retightened, so that the normal force exerted on the brake lining increases at least to a normal force $FLN_N$ sufficient for an emergency stop.

For a floor stop, the actuator is deactivated when the elevator car is at standstill, whereas the lock is activated. The first tightening means again moves the brake lining against the brake track. However, removable brake lining cannot adjust due to the first adjustment limiting means disposed in its first setting, so that the normal force exerted thereon is limited to a smaller normal force $FLN_H$, or biasing force, sufficient for holding. The normal forces which the first tightening means exerts on the movable brake lining thereby differ between a floor stop and an emergency stop, through the increase in normal force which the tightening means additionally applies in the case of the adjusting movement of the movable brake lining.

Brake equipment according to the present invention thus exerts, in a floor stop, a smaller normal force $FLN_H$ on the movable brake lining and automatically has in an emergency stop, in correspondence with the adjusting movement of the movable brake lining, a higher normal force $FLN_N$.

Brake equipment according to the present invention and a brake track are therefore less strongly loaded in normal operation. In addition, the actuator can be designed for this smaller normal force $FLN_H$.

In a preferred, other embodiment of the present invention the same advantages can also be realized without the first adjustment limiting means, which reduces the constructional and control outlay and increases the security against failure.

In this connection the brake equipment comprises, according to the first embodiment of the present invention, instead of the first adjustment limiting means a multi-part brake lining, in particular a fixed brake lining and a movable brake lining, which are together biased by the first tightening means and released by the actuator, wherein advantageously the movable brake lining is biased by a second tightening means against the brake track when the first brake lining comes into contact with the brake track. The multi-part brake lining in that case acts on a common brake surface of the brake track.

If this brake equipment exerts a holding function, then only the bias of the second tightening means acts on the movable brake lining. This is preferably selected to be relatively small so that the major part of the force exerted by the first tightening means when the actuator is deactivated acts as a normal force on the fixed brake lining. This normal force depends, inter alia, on the resilience of the second tightening means and on the gap between released fixed brake lining and brake track and can be selected correspondingly. In every case the design is such that a major part of the normal force acts on the fixed brake lining, whereby a maximum holding force can be achieved. Thus, a minimum normal force acts on the other hand in the case of holding at a floor stop without the movable brake lining then having to be adjusted; a movement, which is necessary for that purpose, of the brake equipment relative to the brake track is prevented by the friction couple of the fixed brake lining with the brake track.

In the case of an emergency stop, thereagainst, the movable brake lining, which is biased by the second tightening means and correspondingly protrudes beyond the fixed brake lining when this does not yet contact the brake track, initially comes into contact with the brake track. It is thereby adjusted under friction couple with the brake track and then tightens the first tightening means, whereby the normal force acting on the movable brake lining increases to a higher normal force $FLN_N$ sufficient for an emergency stop. The fixed brake lining in that case preferably no longer comes into contact with the brake track and the force flow takes place exclusively by way of the movable brake lining. The emergency braking function, however, is also ensured in the case of a possible slipping out of a holding position, since the movable brake lining pressed-on by a small force was adjusted under frictional couple with the brake track as described.

Brake equipment according to this embodiment thus also exerts, during holding, a lower normal force $FLN_H$ on the fixed and movable brake linings and in the case of an emergency stop automatically has available a higher normal force $FLN_N$ in correspondence with the adjusting movement of the movable brake lining. Since the normal force during holding is substantially absorbed by the fixed brake linings, approximately the entire biasing or normal force is available for holding.

Thus, in the case of both embodiments an adjusting movement of the movable brake lining and thus a sagging of the car and an increase in the normal forces acting on the brake track can be prevented at a floor stop, i.e. when the actuator is deactivated with the elevator car at standstill. This possibly unanticipated slipping can, moreover, be detected in case of need by means of sensor or switch. Thus, a reliable statement with respect to the safety status of brake equipment can also be made. If, for example, due to wear or hardening of the fixed brake lining, which is to provide holding of the car at a floor, a holding capability diminishes, this is attributable to slipping of the car, which, as described, leads to adjustment of the movable brake lining and thus in turn to holding. Since this can now be detected by means of the sensor or switch an unsafe state cannot arise, since maintenance or repair of the brake equipment can be initiated in good time.

The brake equipment is preferably arranged at the elevator car. The car is guided along rails which are used at the same time as the brake track. Two or more items of brake equipment are advantageously arranged in pairing, wherein in each instance at least one respective item of brake equipment acts on a rail. This is advantageous, since in this arrangement the elevator car is directly fixed and thus no vibratory processes arise at the car during loading and unloading procedures. Alternatively or additionally the brake equipment can also be arranged at the drive, wherein then the brake track is defined by a brake disc or drum. The drive can in this connection be arranged separately in or outside the shaft and operation of the elevator car then takes place by way of support means. The drive can obviously also take place directly at the car or also at the counterweight. A relative movement between brake equipment and brake track can obviously take place differently. Thus, the brake track can be mounted in stationary location and the brake equipment moves along the brake track or the brake equipment can be arranged in stationary location, wherein then the brake track or a brake disc moves along the brake equipment.

In a further preferred embodiment of the present invention the embodiment described in the foregoing or the first embodiment is so developed that it can fulfill, apart from the emergency stop braking function, also a free-fall braking function. This is particularly advantageous when the brake equipment is arranged at the car.

For this purpose this particularly preferred embodiment comprises a second adjustment limited means which in a first setting limits an adjusting movement of the movable brake lining and in the second setting makes a further adjusting movement of the movable brake lining possible.

In an emergency stop situation the second adjustment limiting means, which like the first adjustment limiting means is preferably switched to be active by a lock supplied with energy so that in the case of failure of this energy supply the adjustment limiting means is switched to the second setting automatically or under the effect of the adjusting movement of the movable brake lining, is switched to the first setting in which the adjustment movement of the movable brake lining is limited to a specific maximum movement. As described in the foregoing, the movable brake lining automatically adjusts, as a consequence of the friction couple with the rail, until the second adjustment limiting means prevents a further adjusting movement thereof. This maximum adjustment movement, which is predetermined by the second adjustment limiting means, limits the normal force $FLN_N$ maximally arising in the case of an emergency stop so that an excessive braking retardation on the passengers and a correspondingly high loading of the brake equipment, the rail and the elevator car be avoided.

Thereagainst, in the case of free-fall braking higher braking forces must be applied and the loads accompanying that have to be taken into account in order to prevent crashing down of the elevator car. For a free-fall braking the second adjustment limiting means is therefore deactivated so that the movable brake lining further adjusts and thus the first tightening means can further tighten. An increase in the normal force $FLN_F$ acting on the movable brake lining and a corresponding increase in the braking force acting on the elevator car thereby automatically take place. The adjustment limiting means is preferably constructed in such a manner that it can be deactivated even during braking when, for example, an insufficient retardation was detected during the emergency stop. Thus, the normal force can, in the case of need, be further increased during braking. This second amplification stage allows a braking force finely stepped with respect to the different braking situations. Brake equipment without this second amplification stage can obviously also be used for a free-fall braking, wherein then a braking force excess exists in emergency stopping operation. This is a favorable embodiment, since no adjustment limiting means are required and, nevertheless, low biasing forces can be used for holding.

In a preferred manner the brake equipment comprises a third tightening means which biases the movable brake lining against its adjusting movement. It is thereby advantageously ensured that the movable brake lining is in travel operation always disposed in its non-adjusted position. In the case of an emergency stop or free-fall braking the movable brake lining can be adjusted against the third tightening means, which for this purpose is preferably constructed to be appropriately weak.

The stiffness of the first tightening means is preferably progressive. Thus, the normal force increasing with adjustment of the movable brake lining rises so that particularly high braking forces are available in the case of an emergency stop or free-fall braking at which a large adjusting movement takes place. On the other side, for release of the brake lining, when the first tightening means has still a lower stiffness, only a comparatively small amount of actuator energy is expended.

For this purpose the first tightening means can comprise a holding tightening means, the tightening travel of which is limited, and an amplifying tightening means, the stiffness of which is higher than that of the holding tightening means. Holding tightening means and amplifying tightening means are preferably connected in series so that initially, for example in the case of release of the brake linings, the actuator operates against the softer holding tightening means and for this purpose needs less energy. If the tightening travel thereof is used up, which travel is advantageously so dimensioned that it substantially corresponds with the gap between brake lining and rail, then, for example with an adjusting movement of the movable brake lining, exclusively the stiffer amplifying tightening means has to now be tightened, which increases the normal force for the emergency stop or the free-fall braking. The amplifying tightening means can obviously also be directly integrated in components of the brake equipment in that, for example, brake pincers are constructed to be appropriately elastically resilient.

In order to realize the adjusting movement of the movable brake lining this can be mounted by way of a wedge surface at the brake pincers, which are loaded by the first tightening means and the actuator, wherein the wedge surface produces the adjusting movement of the movable brake lining. If the movable brake lining follows the movement of the brake track relative to the brake equipment under frictional couple then the wedge surface at the same time as the stroke movement of the movable brake lining constrains release of the brake pincers perpendicularly thereto. This release travel can be used for tightening the first tightening means.

In another embodiment of the present invention the brake lining is mounted at the brake pincers by way of an eccentric disc, so that the eccentric disc produces the adjusting movement of the brake lining. If the eccentric disc follows, for example by means of a cam, by friction couple the movement of the brake track relative to the brake equipment then the eccentric disc co-rotates with the stroke movement of the movable brake lining and in that case changes the spacing of the movable brake lining relative to the fulcrum of the eccentric disc. This change in spacing can be used for tightening the first tightening means. Advantageously the eccentric disc has a region of low stiffness. A major part of the effective biasing force is thus led by way of the brake lining and a holding force can be obtained with minimum biasing force.

The brake equipment according to the present invention preferably comprises two brake circuits, of which each has a movable brake lining and a first adjustment limiting means and/or an adjustable brake lining. The two brake circuits in that case act on a brake track with two brake surfaces, which brake surfaces are advantageously formed by opposite surfaces of a rail web. The two brake circuits can thus clamp the brake track or rail web in place. The adjustable brake linings of the two brake circuits can be loaded by way of individual first tightening means and actuators. Advantageously, however, the movable brake linings of the two brake circuits are loaded by a common first tightening means and a common actuator, which advantageously reduces the constructional cost and space requirement. Alternatively, obviously also merely one of the brake circuits can be equipped with a movable brake lining and an adjustment limiting means and/or an adjustable brake lining, whilst the other brake circuit is constructed with a fixed brake lining.

The movable brake linings of the two brake circuits can automatically adjust relative to the rail for the same or different directions of travel of the elevator car.

If the brake linings adjust in the case of different directions of travel then the braking force increase can act in both directions, wherein advantageously different adjusting paths and thus different braking force increases can be represented. If, for example, the elevator car is partly balanced, difference emergency braking loads can arise, when the support means is intact, depending on the car loading. Conversely, the braking force increase can be increased in one direction when the two movable brake linings adjust in the case of the same direction of travel.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
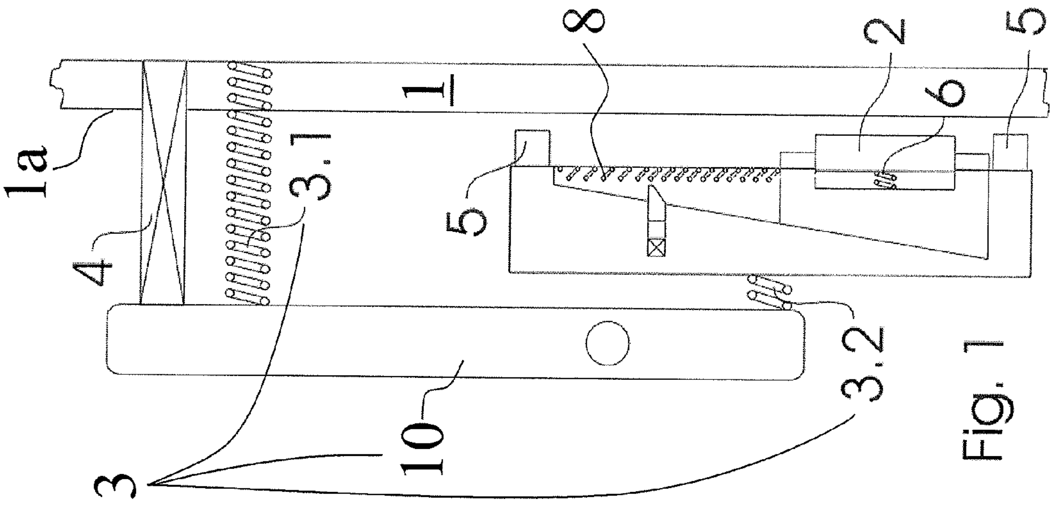
FIG. 1 is a schematic view of one half of the brake equipment according to the present invention shown in FIG. 3 in a released state.
Figure 2:
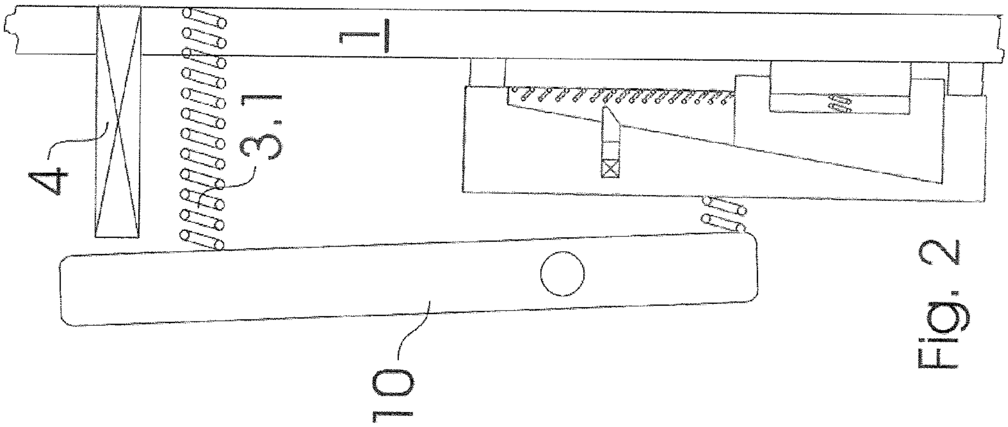
FIG. 2 is a view similar to FIG. 1 with the half of the brake equipment at a floor stop.
Figure 4:
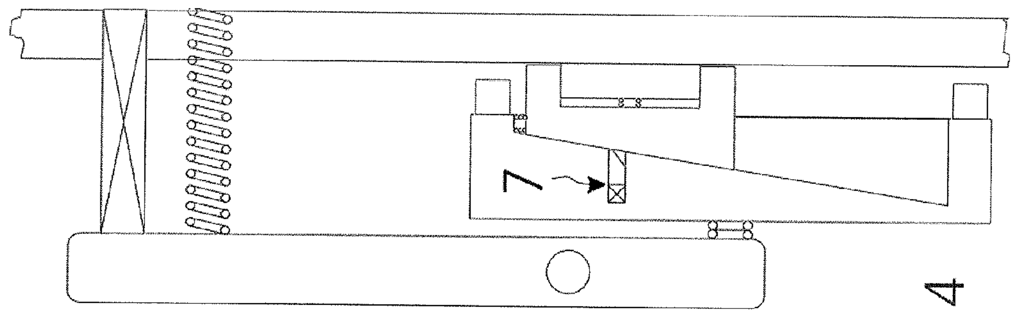
FIG. 4 is a view similar to FIG. 1 with the half of the brake equipment in the case of a free-fall braking.
Figure 3:
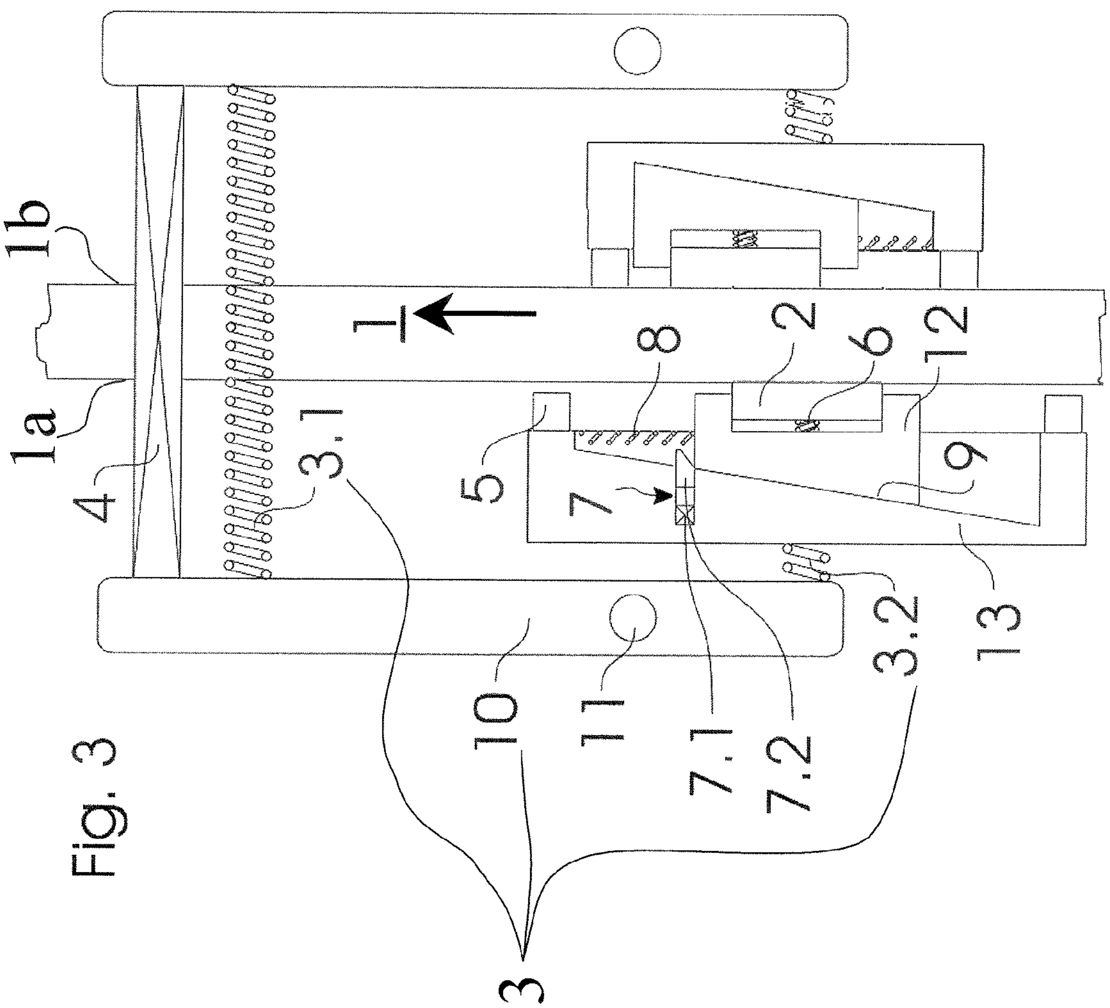
FIG. 3 shows the brake equipment according to a first embodiment of the present invention in the case of an emergency stop.

FIGS. 1 to 4 show holding and emergency-stop braking equipment according to a first embodiment of the present invention. In that case FIG. 3 shows the brake equipment, which comprises two brake circuits, as a whole. Since both brake circuits are constructionally identical as far as differences explained in the following, only the left-hand brake circuit is illustrated in FIGS. 1, 2 and 4, so as to explain the different brake situations; the function of the right-hand brake circuit is basically analogous. Parts acting in the same manner are provided in the figures with the same reference numerals.

As can be seen, in particular, in FIG. 3 each brake circuit of the brake equipment according to the preferred embodiment of the present invention comprises a brake pincer arm 10 which is mounted at a pin 11 to be rotationally movable. A holding tightening means in the form of a first compression spring 3.1 resiliently biases the two brake pincer arms 10 towards a guide rail 1, at which an elevator car (not illustrated)—to which the brake equipment is fastened—can vertically move. The guide rail 1 has two brake surfaces 1*a*, 1*b*. An actuator in the form of an electromagnet 4 can release the brake pincer arms 10 against the stress of the first compression spring 3.1 and in this example serves at the same time as an abutment, i.e. limits the tightening travel of the first compression spring 3.1.

A brake wedge mount 13 is guided at each brake pincer arm 10 to be displaceable towards the rail 1 and in this direction is resiliently mounted by a reinforcing tightening means in the form of a fourth compression spring 3.2, which has a higher spring stiffness than the first compression spring 3.1. The first and fourth compression springs 3.1, 3.2 form together with the brake pincer arm 10 a first tightening means chain or a first tightening means 3.

In the brake wedge mount 13 a brake wedge 12 can move in the direction of the relative movement between the elevator car and the rail between two abutments and is in that case constrainedly guided by a wedge surface 9. In the left-hand brake circuit the wedge surface 9 is so oriented that the brake wedge 12 presses the brake wedge mount 13 against the fourth compression spring 3.2 when it moves upwardly relative to the brake wedge mount 13. In the right-hand brake circuit the brake wedge, thereagainst, presses the brake wedge mount against the fourth compression spring when it moves downwardly relative to the brake wedge mount 13.

A third tightening means in the form of a relatively weak third compression spring 8 confines the brake wedge 12 in the brake wedge mount 13 in its lowermost (left-hand brake circuit) or uppermost (right-hand brake circuit) starting position limited by an abutment. In addition, in this example a second adjustment limiting means 7 in the form of a wedge 7.1 is provided, which under the force of an activated lock in the form of a further electromagnet 7.2 protrudes into the wedge surface 9 and limits movement of the brake wedge 12 along the wedge surface 9. If the further electromagnet 7.2 is activated, then it presses the wedge 7.1 to such an extent into the wedge surface that the brake wedge 12 can move out of its initial setting (FIGS. 1, 2) only as far as a middle setting shown in FIG. 3. If the further electromagnet 7.2 is deactivated, then the brake wedge 12 can displace the wedge 7.1 out of the wedge surface 9 and move into its uppermost (left-hand brake circuit) end setting shown in FIG. 4. The brake wedge of the right-hand brake circuit remains, in the illustrated example, in its upper position, since the relative travel direction of the rail with respect to the brake equipment keeps it in this position.

In the illustrated example the left-hand brake circuit has a long wedge surface 9. This gives a correspondingly large adjustment possibility and a correspondingly large tightening possibility of the tightening element 3, from which a correspondingly high maximum normal force $FLN_F$ can result when the left-hand brake wedge 12 passes into its upper end setting. Thereagainst, the right-hand brake circuit has a shorter wedge surface. The maximum attainable normal force is thereby smaller when the relative travel direction of the rail with respect to the brake equipment runs conversely. The force level can thereby be designed in dependence on the respective direction of travel.

In the brake wedge 12 a movable brake lining 2 is guided to be displaceable towards the rail 1 and in this direction is resiliently mounted by a second tightening means in the form of a second compression spring 6, which has a low spring stiffness.

Apart from the abutments which limit the movement of the brake wedge 12, fixed brake linings 5 are so arranged at the brake wedge mount 13 that they are somewhat set back relative to the contact surface of the movable brake lining 2 with the rail 1 when the second compression spring 6 is relaxed.

The function of the brake equipment according to the first embodiment of the present invention is now explained in more detail on the basis of the sequence of FIGS. 1 to 4.

Released Brake

FIG. 1 shows the left-hand brake circuit of the brake equipment in released or deactivated state. For this purpose the electromagnet 4 is supplied with energy, draws the brake pincer arm 10 against its left-hand end face functioning as an abutment and in that case maximally tightens the first compression spring 3.1. The adjustment path of the brake pincer arm 10 relative to the rail 1 is so dimensioned that in the released state the movable brake lining 2 and the fixed brake linings 5 do not contact the rail 1 and the brake surface 1*a*. The second compression spring 6 is therefore relaxed and the movable brake lining 2 set in its starting position protruding furthest from the brake wedge 12. The third compression spring 8 is similarly relaxed, so that the brake wedge 12 is set in its lowermost starting position. In addition, the fourth compression spring 3.2, which is stiff by comparison, is relaxed, since no forces act on the brake wedge mount 13.

In this released state the electromagnet 4 only has to be supplied such an amount of energy that it maximally stresses the first compression spring 3.1. It thus does not have to work against, in particular, the fourth compression spring 3.2. The elevator car and the brake equipment fastened thereto can move vertically relative to the rail 1 without hindrance.

Floor Stop

FIG. 2 shows the left-hand brake circuit of the brake equipment at a floor stop. After the elevator car has been brought to a standstill by way of a support means by a drive unit (not illustrated) at the floor level the electromagnet 4 is deactivated. Referring to FIGS. 2 and 3, the first compression spring 3.1 thereby partly relaxes and presses on the brake pincer arm 10, which as a consequence thereof rotates about the pin 11. In that case the movable brake lining 2 initially goes into contact with the rail 1. Since the second compression spring 6 is relatively weak, under the action of the first compression spring 3.1, which rotates the brake pincer arm 10 further about the pin 11 towards the rail 1, the second compression spring is stressed until the fixed brake linings 5 also come into contact with the rail. The brake pincer arm 10 further rotates until the fourth compression spring 3.2 is stressed to such an extent that it exerts an equally large counter-torque relative to the spring force of the first compression spring 3.1.

The first compression spring 3.1 is biased so that even in this position a spring force "F1" is still exerted on the lever arm, which lies above the pin 11, of the brake pincer arm 10. Correspondingly, the lever arm, which lies below the pin 11, of the brake pincer arm 10 exerts a force "F2" on the fourth compression spring 3.2. Since the ratio "I" between upper and lower lever arms of the brake pincer arm is selected to be greater than one, this translation amplifies the force exerted by the first compression spring 3.1 on the second compression spring 3.2 so that $F2=i\times F1>F1$. Advantageously, the electromagnet 4 therefore has to apply only a relatively low force in order to maximally stress the biased first compression spring 3.1 and thus release the brake equipment.

A normal force "N1", which results from the tightening travel "s" of the second compression spring 6, acts on the movable brake lining 2 until the fixed brake linings 5 contact the rail 1. Since the spring stiffness "c6" of the second compression spring 6 is selected to be relatively low this normal force is similarly relatively low, thus $N1=c6\times s$.

A normal force "$FLN_H$" therefore acts in the fixed brake linings 5, which normal force corresponds with the significant proportion of the force "F2" exerted by the second compression spring 3.2 on the brake wedge mount 13: $FLN_H=F2-N1\approx i\times F1$.

In the example, the elevator car is held at a floor stop by two constructionally identical items of brake equipment according to the preferred embodiment of the present invention, so that the weight force "G" of the elevator car or the difference force between counterweight and car distributes in each instance by a quarter to the fixed brake linings 5 of a brake circuit of brake equipment. The biasing of the first compression spring 3.1 is now selected so that in the holding position it exerts on the brake pincer arm 10 a spring force:

$$F1=1/i\times[G/(4\mu)+c6\times s]. \quad (1)$$

In that case "μ" denotes the coefficient of static friction between the rail 1 and the fixed brake linings 5. For the sake of better clarity, safety factors have been disregarded in equation (1).

The elevator car is thus held at a regular floor stop substantially by way of the friction couple between the fixed brake linings 5 and the rail 1 and the movable brake lining remains in its starting position shown in FIG. 2.

Without the fixed brake linings 5 the entire weight force "G" would be supported at the rail 1 only by way of the movable brake linings 2. Since only a normal force N3=cos (wedge angle)×F2<F2 acts in the wedge surface 9 and, in addition, the coefficient of friction in the wedge surface is relatively small so as to ensure easy displacement of the brake wedge 12 in the brake wedge mount 13, the brake wedge 12 was caused to slide on the wedge surface 9 under the action of the above-explained spring force "F1" according to equation (1), which would cause sagging of the elevator car in the case of holding of the brake equipment at a floor stop until the adjustment, which is described in more detail in the following, leads to a sufficient increase in the normal force "N3". Alternatively, an appropriately higher bias of the first compression spring 3.1 would have to be provided in order to appropriately increase to F2=i×F1. Then, however, the electromagnet 4 in the released state would have to apply a correspondingly higher energy in order for this force to hold the equilibrium weight.

In a second embodiment (not illustrated) of the present invention there is provided, instead of the fixed brake linings 5, a first adjustment limiting means which is functionally identical with the second adjustment limiting means 7. This first adjustment limiting means completely blocks a movement of the brake wedge 12 along the wedge surface 9, i.e. fixes the brake wedge 12 in its starting setting. When the first adjustment limiting means is activated the movable brake lining 2, which can now no longer adjust along the wedge surface 9 through movement of the brake wedge 12, acts as a fixed brake lining, so that, as described in the foregoing with reference to the first embodiment, sagging of the elevator car at a floor stop or a high bias of the first compression spring 3.1 can be avoided.

Emergency Stop

FIG. 3 shows the brake equipment in the case of an emergency stop. As explained in the foregoing, the elevator car in the example of embodiment has two constructionally identical items of brake equipment according to the first embodiment of the present invention, which, for example, each act on the guide rails 1 arranged on both sides of the car. In the case of an emergency stop the elevator car, with intact support means, can be retarded by the brake equipment to a standstill if, for example, the motor brake of the drive unit fails or a control defect is present. In addition, for safety reasons it can be required that the remaining brake equipment, even in the case of failure of one of the items of brake equipment, itself in an overload state at least does not further accelerate.

In the present case (with two items of brake equipment) each item of brake equipment must thus individually be in a position of supporting the excess weight force "U" of the elevator car. Correspondingly, each brake circuit has to exert, by comparison with the afore-described holding at a floor stop, a significantly higher friction force on the rail 1. In the case of an overload state of 125% of the normal load and a weight difference of 50% of the normal load between counterweight and car there thus results the requirement for a braking force increased by the factor three and thereby also a correspondingly increased normal force.

In the case of an emergency stop, proceeding from the released state according to FIG. 1, the electromagnet 4 is deactivated whilst the elevator car travels along the rail 1. The first compression spring 3.1 thereby rotates the brake pincer arm 10 about the pin 11 towards the rail 1. In this connection initially the movable brake lining 2, which is correspondingly biased by the second compression spring 6, comes into frictional contact with the rail 1.

The normal force then produced by the second compression spring 6 produces a friction force which acts on the movable brake lining and which seeks to entrain this in the direction of the movement of the brake equipment relative to the rail 1. If the elevator car, for example, moves vertically downwardly then the movable brake lining 2 is displaced upwardly. In that case it entrains the brake wedge 12 which then slides upwardly on the wedge surface 9.

Due to the wedge action the brake wedge 12 then urges the brake wedge mount 13 outwardly. On the one hand, the fixed brake linings 5 are thereby prevented from still coming into contact with the rail 1; the friction couple further takes place exclusively by way of the movable brake lining 2. On the other hand, the outwardly migrating brake wedge mount 13 stresses the fourth compression spring 3.2 and thereby, by way of the brake pincer arm 10, also the first compression spring 3.1. The brake pincer arm 10 thereby resets against the force of the first compression spring 3.1, whilst the first and fourth compression springs 3.1, 3.2 and, depending on the respective construction, the first tightening means 3 comprising the resilient brake pincer arm 10 are stressed. Through this adjusting movement of the movable brake lining 2, i.e. the stroke thereof in rail direction, the first tightening means 3 is additionally tightened so that the normal force exerted by it on the movable brake lining and thus the braking force of the brake equipment increase.

The brake pincer arm 10 in that case runs against the abutment which is formed by the end face of the electromagnet 4 and which prevents further compression of the first compression spring 3.1. If the movable brake lining 3 together with the brake wedge 12 now displaces further upwardly and in that case urges the brake wedge mount 13 further outwardly then only the fourth, stiffer compression spring 3.2 and a spring stiffness defined by the brake pincer arm 10 or other components of the brake equipment are further stressed. Through this switching over from the first, softer and fourth, harder compression springs 3.1, 3.2 arranged in series exclusively to the fourth compression spring 3.2 the stiffness of the first tightening means 3 progressively increases.

In the case of an emergency stop the further electromagnet 7.2 of the second adjustment limiting means 7 is activated. This presses the wedge 7.1 into the wedge surface 9, which limits the displacement of the brake wedge 12 along the wedge surface 9 and stops the movable brake lining 2 in the middle setting.

In this middle setting the left-hand brake circuit exerts a higher normal force on the rail 1 than is the case with holding at a floor stop, in which the electromagnet is deactivated, after the elevator car has come to a standstill: on the one hand the movable brake lining 2 adjusts itself under friction couple with the rail 1 and in that case tightens the first tightening means 3 more strongly than in the case of a floor stop. The additional tightening travel can be predetermined by a selection of the wedge angle and/or the length thereof. On the other hand, the stiffness of the first tightening means 3 jumps to a significantly higher value as soon as the brake pincer arm 10 abuts the electromagnet 4 and the first compression spring 3.1 can no longer be compressed. The further adjustment is completely converted into compression of the stiffer, fourth compression spring 3.2. It is obvious that the wedge angle has to be selected with consideration of the anticipated coefficient of friction so that an independent adjusting is guaranteed.

The movable brake lining 2 thus automatically adjusts under friction couple with the rail 1 in the case of movement of the elevator car relative to the rail and then tightens the first tightening means so that the normal force acting on the movable brake lining and thus the friction force applied by the brake equipment increase. Nevertheless, the electromagnet 4 only has to apply a relatively small amount of energy in order to release the brake equipment, since for this purpose only the first compression spring 3.1 has to be maximally stressed. In this connection it is obvious that the adjusted movable brake lining prior to release of the brake equipment is moved initially in the direction of its normal position which, for example, is defined by spring 8. This can be achieved in that the brake equipment is moved in a direction opposite to braking. In this connection it is to be noted that a left-hand and an oppositely directed right-hand wedge surface, as shown in FIG. 3, are so matched to one another in the length thereof that in every case an air gap arises at the actuator 4 when the brake equipment is moved in the direction opposite to braking.

The fixed brake linings 5, which together with the movable brake lining 2 are biased by the first tightening means 3 and released by the electromagnet 4, come into contact with the rail 1 only when the electromagnet 4, when the elevator car is stationary, is deactivated, since the movable brake lining is biased by the second compression spring 6 towards the rail 1 and comes into contact with the rail 1 before the fixed brake linings 5. They prevent, in the case of a floor stop, sagging of the elevator car, but do not function in the case of an emergency stop so that the movable brake lining 2 adjusts and thus the braking force increases to the value limited by the second adjustment limiting means 7. On use of the brake equipment shown in FIG. 3 only the fixed brake linings are significantly loaded in the case of a floor stop, wherein in the case of an emergency stop or free fall the braking force is introduced at one side by way of the movable brake linings and at the opposite side by way of the fixed brake linings. This results due to the oppositely directed construction of the wedge surface.

As can be seen in FIG. 3, the movable brake linings 2 of the two brake circuits automatically adjust in the case of different directions of travel of the elevator car relative to the rail: due to the wedge surfaces inclined in opposite sense the movable brake lining of the left-hand brake circuit adjusts when the elevator car is braked during a downward travel, whereas the movable brake lining of the right-hand brake circuit adjusts when an emergency stop takes place during an upward travel of the elevator car. Through different dimensioning of the two brake circuits, particularly the wedge angle and/or wedge surface lengths and the stiffnesses of the fourth compression spring, different braking force amplifications can be predetermined for the upward and downward directions of travel, which is of advantage particularly in the case of partly balanced elevators in which the elevator car connected by way of the intact support means with a counterweight is drawn upwardly or slips downwardly in the case of failure of the drive unit. Alternatively, both brake circuits can also adjust in the case of the same direction of movement of the elevator car relative to the rail and thus particularly strongly increase the braking force in the event of an emergency stop in one movement direction.

A further advantage of the present invention manifests itself if the friction force between rail 1 and fixed brake lining 5 is erroneously too small, because, for example, the fixed brake lining or the rail has wear or is contaminated so that the coefficient of friction reduces. If in the case of a floor stop the friction force applied by way of the fixed brake lining is insufficient, then the elevator car sags slightly as described in the foregoing. The movable brake lining 2 thereby adjusts until the stress, which is increased by its adjustment, of the first tightening means 3 is of such a height that a sufficient friction force is produced. To that extent the present invention makes available safety-redundant brake equipment which in the case of an erroneous too-small friction force at a floor stop automatically readjusts until a sufficient friction force is present in order to securely hold the elevator car. This adjusting movement could be detected by a sensor, whereby sagging at the stop is detected and appropriate maintenance operations could be initiated.

Free-Fall Braking

FIG. 4 shows the brake equipment in the case of free-fall braking. Essentially, this takes place like the afore-described emergency stop. Since, however, in the case of free-fall braking the support means is defective and the elevator car is no longer braked at least partly by a counterweight and an internal friction of a drive unit the brake equipment here has to exert an even higher braking force.

For that purpose the second adjustment limiting means 7 is deactivated, in that the further electromagnet 7.2 is not supplied with energy. As in the case of the emergency stop, on deactivation of the electromagnet 4 initially the movable brake lining 2 comes into friction-coupling contact with the rail 1, is entrained by this and in that case adjusts. The normal force acting in the friction contact between movable brake lining and rail thereby increases and correspondingly the braking force. Since the wedge 7.1 is no longer blocked by the further electromagnet 7.2, the brake wedge 12 presses it downwardly out of the wedge surface 9 and can thus move to an uppermost (left-hand brake circuit) end setting where it is stopped by the other one of the two abutments in the brake wedge mount 13.

The adjusting travel of the movable brake lining 2, by which the fourth compression spring 3.2 is stressed, is thereby increased above the value achieved in the case of an emergency stop, in which the adjusting movement is stopped by the second adjustment limiting means 7 in the middle setting. Correspondingly, the normal force exerted by the fourth compression spring 3.2 increases and thus the braking force acting on the rail 1.

Advantageously this maximum braking force is achieved only in the case of free-fall braking, whereas the activated second adjustment limiting means limits the braking force in the case of an emergency stop to a lower value and thus avoids unnecessary loadings of the guide rail 1, the elevator car, the brake equipment and the passengers.

Since a free fall can take place only in downward direction in general only one side of the brake equipment (in the illustrated example, the left-hand side) is furnished with a corresponding adjustment stroke and the other side has a correspondingly reduced adjustment stroke. Obviously, however, further adjustment limiting means for definition of intermediate brake values could be used.

Preferably, abutments limit the adjustment travel of the movable brake lining 2 relative to the brake wedge 12 so as to avoid overloading of the second compression spring 6. The adjustment limiting means 7 can also be equipped, instead of with the electromagnet 7.2, with a spring detent system which enables pressing away of the adjustment limiting means if a definable holding force is exceeded.

Alternative Embodiment

Figures 5A, 5B, 5C, 5D:
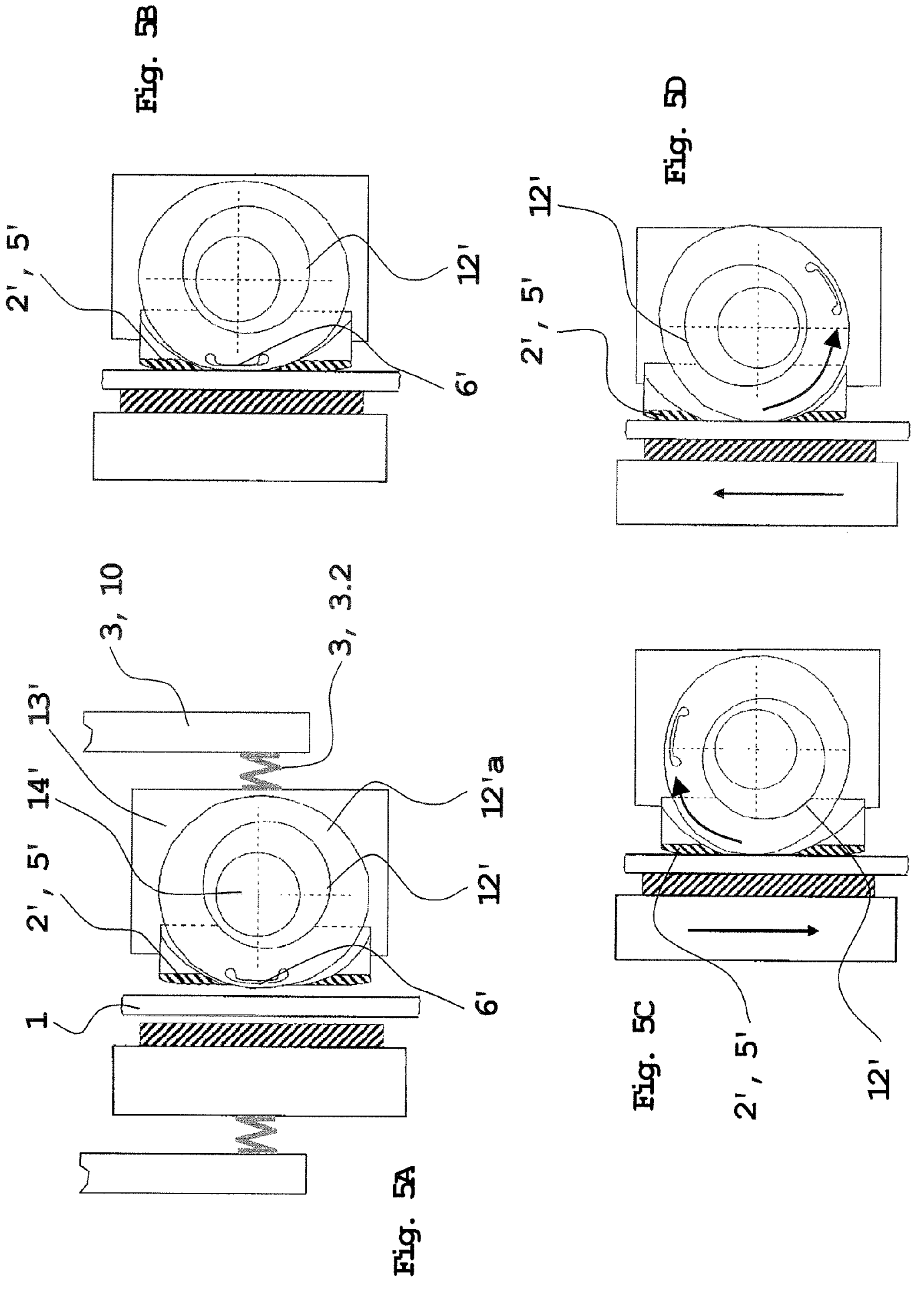
FIGS. 5A-5D are schematic views of brake equipment according to a further embodiment of the present invention in different brake positions.

FIGS. 5A to 5D show an alternative adjustment of the movable brake lining 2' by an eccentric disc 12' in the different braking situations of “released” (FIG. 5A), “floor stop” (FIG. 5B), “braking downwards” (FIG. 5C) and “braking upwards” (FIG. 5D). The brake equipment with this alternative adjustment corresponds in its basic construction to the afore-described first embodiment so that consequently there is discussion merely of the differences from the first embodiment.

In the brake equipment with the alternative adjustment the movable brake lining 2' is guided at the eccentric disc 12' which is mounted at an eccentric mount 13' to be rotatable about a pin 14'. The eccentric mount 13' corresponds to that extent with the brake wedge mount 13 of the first embodiment so that the following construction with first tightening means, actuator and the like is not illustrated.

The eccentric disc 12' is resiliently confined relative to the eccentric mount 13' by a centering spring or a detent (not illustrated) and is biased by this centering spring or the detent into the setting shown in FIG. 5A, so that the movable brake lining 2', which at the same time also takes over the function of the first brake lining 5', protrudes beyond the contact plane of a cam disc 12'*a* fixedly connected with the eccentric disc 12' when the brake equipment is released (FIG. 5A). A further brake circuit advantageously consists of a fixed brake lining 5', which is connected in already illustrated mode and manner by means of compression spring 3.2 and pincers 10 with a first tightening means, actuator and the like.

In the case of a floor stop the eccentric mount 13' is pressed, when the elevator car is at standstill, by way of the brake pincers (not illustrated) like the brake wedge mount 13 of the first embodiment by the first compression spring against the rail 1 in that the electromagnet is deactivated. In this connection a resilient region 6' of the control cam 12'*a* can be pressed back to such an extent that the brake lining 2', 5' contacts the rail 1 and transmits thereto in friction-locking manner the substantial proportion of the braking force (FIG. 5B).

If the electromagnet is deactivated in the case of an emergency stop whilst the elevator car moves relative to the guide rail 1 then the eccentric mount 13' in turn is moved relative to the rail 1. In this connection, initially the control cam 12'*a* comes into friction-locking contact with the rail 1 and is entrained by this, wherein the eccentric disc 12' rotates on the pin 14' relative to the eccentric mount 13'. The brake lining 2', 5' thereby adjusts and stresses the first tightening means, since the eccentric mount 13' is displaced outwardly by mechanically positive couple (FIG. 5C, FIG. 5D). The shape of the control cam 12'*a* in this connection defines a continuous rotational angle since the control cam is co-rotated by a friction couple until the eccentric disc has adjusted the brake lining 2', 5' to such an extent relative to the rail that this takes over a principal part of the normal force. The control cam is advantageously provided with a friction-assisting surface, for example roughened and hardened. The resilient region 6' of the control cam 12'*a* is, according to the invention, constructed in such a manner that in the case of a movement of the brake equipment relative to the rail 1 the cam is co-rotated, but on the other hand on stopping at a floor the substantial part of the normal force is taken over by the brake lining 2', 5'.

Through the tightening by means of cam and eccentric disc and the outward displacement of the eccentric mount 13' the normal force acting on the movable brake lining 2' increases so that the friction force or braking force, which is now transmitted substantially by way of the brake lining 2', 5' contacting the rail 1, increases to such an extent that a value sufficient for an emergency stop is attained.

Depending on the respective travel direction (upwards or downwards) the cam 12'*a* together with the eccentric disc 12' defines the tightening of the brake equipment. Thus, for example, in the case of braking downwardly, as illustrated in FIG. 5C, the brake equipment is substantially tightened and a correspondingly high braking force is built up. Thus, a free fall of the elevator car can be safeguarded. In the case of braking upwardly, as apparent in FIG. 5D, the brake equipment is comparatively less tightened by the cam 12'*a* rotating in reverse direction, whereby a correspondingly lower braking force sets in.

In this embodiment as well an adjusting movement can from case to case be limited by means of an adjustment limiting means in that the rotational movement of the eccentric is limited by a switchable lock. In that case it is necessary to give attention to careful matching of the cam with the eccentric. In a given case the control cam is similarly to be resiliently constructed in the region of the rotational limitation or at the place where the cam, on rotational limitation, is in contact with the rail. The illustrated brake equipment is shown in the example of use as a car brake. However, this equipment can also be executed as part of the drive. Equally, it can be arranged at the counterweight. Moreover, in the example there was discussion only of the coefficient of friction. Obviously the design can also take into consideration differences between coefficient of static friction and coefficient of sliding friction.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake equipment for holding and braking an elevator car in an elevator installation, the brake equipment being movable along a brake track in two directions of travel, the brake equipment comprising:

a brake mount having a fixed brake lining fixed on said brake mount and a movable brake lining movable relative to said brake mount, said movable brake lining having a contact surface;

a first tightening means connected to said brake mount for moving said brake mount to a stopped state for biasing said brake mount against a brake track and for maintaining said fixed brake lining and said movable brake lining contact surface in contact with a brake surface of the brake track, said contact surface longitudinally extending parallel to a longitudinal direction of the brake surface, the brake surface being common to said fixed brake lining and said movable brake lining; and an actuator configured to move said brake mount between a released state wherein said fixed brake lining and said movable brake lining are removed from contact with the brake surface and said stopped state, whereby when said brake mount is at a standstill position relative to the brake track and in said stopped state, said fixed brake lining applies a holding force to the brake surface, and if said brake mount moves in a first predetermined direction along the brake track from the standstill position, said movable brake fining automatically cooperates with the brake surface to move relative to said brake mount and to apply to the brake surface a braking force greater than the holding force.

2. The brake equipment according to claim 1 wherein said fixed brake lining together with said movable brake lining are biased by said first tightening means and released by said actuator.

3. The brake equipment according to claim 2 wherein a major part of the holding force generated by the biasing force acts through said fixed brake lining when the brake equipment is at the standstill position and a major part of the braking force generated by the tightening force acts through said movable brake lining when the brake equipment is moved.

4. The brake equipment according to claim 2 wherein said movable brake lining is biased against the brake track by a second tightening means when said fixed brake lining is in contact with the brake track.

5. The brake equipment according to claim 4 including a third tightening means which biases said movable brake lining against an adjusting movement.

6. The brake equipment according to claim 2 wherein said movable brake lining is mounted on a wedge surface in said mount, which is actuated by said actuator, wherein said wedge surface causes adjusting movement of said movable brake lining when relative movement occurs between the brake equipment and the brake track.

7. The brake equipment according to claim 1 wherein said movable brake lining is mounted by an eccentric disc in said mount, which is loaded by said first tightening means and said actuator, wherein said eccentric disc causes adjusting movement of said movable brake lining when movement of the brake equipment relative to the brake track occurs.

8. The brake equipment according to claim 7 wherein said eccentric disc has region of lower stiffness than another region of said eccentric disc.

9. The brake equipment according to claim 1 including two brake circuits which are actuated by said actuator and said first tightening means, wherein each said brake circuit has an adjustable brake lining or wherein one of said brake circuit has an adjustable brake lining and another of said brake circuits has a fixed brake lining.

10. The brake equipment according to claim 9 wherein each of said brake circuits has said adjustable brake lining that automatically adjusts for same or different directions of travel of the brake equipment relative to the brake track.

11. The brake equipment according to claim 1 wherein a stiffness of said first tightening means is progressive.

12. The brake equipment according to claim 1 wherein the brake equipment is arranged at an elevator car, wherein the brake track is a guide rail of the elevator car and the two directions of travel are determined by substantially vertically upward to downward movement of the elevator car.

13. The brake equipment according to claim 1 wherein the brake equipment is arranged at an elevator car, the brake track is formed on a guide rail of the elevator car and said fixed brake lining and said movable brake lining contact a common brake surface of the brake track.

14. A method of holding and braking an elevator car in an elevator installation with brake equipment which is arranged relative to a brake track to be movable along the brake track in two directions of travel, which brake equipment includes a brake mount with a fixed brake lining fixed on the brake mount and a movable brake lining movable relative to the brake mount and having a contact surface, wherein the brake mount is released by an actuator, which brake equipment further includes a first tightening means, wherein in an unreleased, activated state of the brake equipment the brake mount and the fixed brake lining are biased by the first tightening means against the brake track by a biasing force, whereby a holding force acting in the two directions of travel is produced when the brake equipment is at standstill, comprising a step of: through a following relative movement of the brake equipment in at least one of the directions of travel, the movable brake lining automatically cooperates with the brake track to move relative to the brake mount and to apply to the brake track a braking force greater than the holding force, the fixed brake lining and the movable brake lining contacting a brake surface of the brake track with said contact surface longitudinally extending parallel to a longitudinal direction of the brake surface in the two directions of travel, wherein the brake surface is common to the fixed brake lining and the movable brake lining.

* * * * *